UNITED STATES PATENT OFFICE.

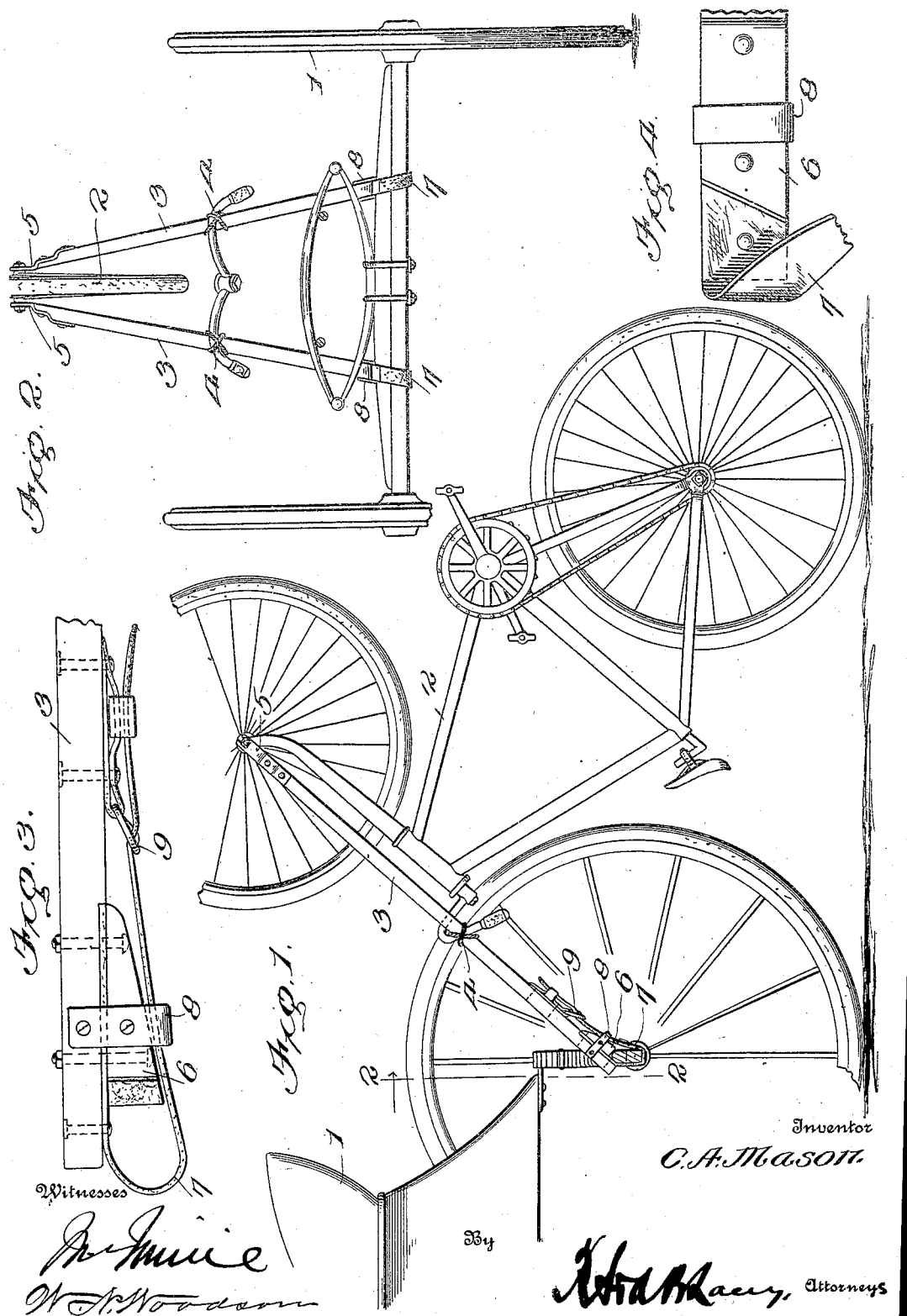

CHESTER A. MASON, OF SPOKANE, WASHINGTON.

ATTACHMENT FOR LEADING BICYCLES.

937,835.  Specification of Letters Patent.  Patented Oct. 26, 1909.

Application filed November 9, 1908. Serial No. 461,740.

*To all whom it may concern:*

Be it known that I, CHESTER A. MASON, citizen of the United States, residing at Spokane, in the county of Spokane and State of Washington, have invented certain new and useful Improvements in Attachments for Leading Bicycles, of which the following is a specification.

The present invention relates to an improved attachment for bicycles whereby they may be conveniently led behind a vehicle, and while the device may be utilized wherever such an arrangement is desired, it has been particularly designed for the use of livery-men who after delivering a rig must either walk back to the stable or pay car fare for riding unless some similar contrivance is provided.

The object of the invention is the provision of a simple and inexpensive bicycle leading attachment which is permanently applied to the bicycle and does not in any manner interfere with the use thereof, but which can be quickly attached to a vehicle should it be desired to lead the bicycle behind the same.

For a full understanding of the invention and the merits thereof and also to acquire a knowledge of the details of construction and the means for effecting the result, reference is to be had to the following description and accompanying drawings, in which:

Figure 1 is a side elevation showing the bicycle leading attachment as fitted to the rear axle of a vehicle, Fig. 2 is a vertical sectional view on the line 2—2 of Fig. 1, Fig. 3 is an enlarged side elevation of the outer end of one of the side bars of the attachment, and, Fig. 4 is an enlarged plan view of the outer end of one of the side bars of the attachment.

Corresponding and like parts are referred to in the following description and indicated in all the views of the drawings by the same reference characters.

Referring to the drawing, the numeral 1 designates a vehicle and 2 a bicycle which is to be led behind the vehicle, the said members being of any approved construction.

The leading attachment comprises essentially a pair of side bars 3 which extend along opposite sides of the fork of the bicycle and have intermediate portions thereof permanently connected in any suitable manner to the handle bars of the bicycle as indicated at 4. These bars converge toward the front axle of the bicycle where they are provided with strap irons 5 which project beyond the extremities of the bars and are forked for engagement with the axle. It will also be observed that the projecting portions of these strap irons are deflected at an angle to the side bars so as to assume a substantially parallel relation to each other. The opposite ends of the bars 3 which diverge and project beyond the handle bars, are designed to be attached to the rear axle of the vehicle when the bicycle is being trailed behind the same. As shown on the drawings, the extremities of the bars rest upon the top of the rear axle of the vehicle, blocks 6 which are secured to the end portions of the bars abutting against the rear face of the axle. Straps 7 which are secured between the bars 3 and the blocks 6 are designed to extend around the vehicle axle to hold the leading attachment securely in engagement therewith and after being drawn around the axle are passed through keepers 8 and engaged by buckles 9 carried by the side bars. In this connection it may be noted that the keepers project from the blocks 6 and also aid in securing the said blocks to the side bars. When the attachment has thus been connected to the rear axle of the vehicle, the bicycle is held in a partially upright and inverted position with the front wheel entirely off of the ground, the rear wheel being designed to travel upon the ground and the frame being perfectly free to swing from side to side. However, after the straps 7 have been loosened and the bars detached from the vehicle axle, the bicycle may be used in the usual manner, the side bars not interfering in any manner with the control of the operator over the machine.

Should the invention be applied to a vehicle having the springs located in such position as will interfere with the placing of the side bars, the latter may be reversed.

Having thus described the invention, what is claimed as new is:

An attachment for leading bicycles from a vehicle, comprising therefor a pair of side bars extending along opposite sides of the fork of the vehicle and having intermediate portions thereof secured to the handle bars, one end of each of the side bars being adapted to be detachably connected to the front axle of the bicycle while the opposite end is designed to bear against the rear axle of the vehicle, a block applied to the opposite end of each of the side bars for abutting against the side of the vehicle axle, a keeper projecting from each of the blocks and aiding in securing the block to the side bar, and straps coöperating with the blocks to detachably secure the side bars to the vehicle axle, the said straps passing through the keepers, whereby the bicycle may be supported in an inverted position with the rear wheel thereof trailing upon the ground.

In testimony whereof I affix my signature in presence of two witnesses.

CHESTER A. MASON. [L. S.]

Witnesses:
 ROY E. MASON,
 RILEY GIRTHOFFER.